April 10, 1962     M. KRAJOWSKY ETAL     3,028,792

VARIABLE POWER SPOTTING TELESCOPE

Filed July 21, 1960

EUGENE L. TURNER
MICHAEL KRAJOWSKY
*INVENTORS*

BY Frank C. Parker

*ATTORNEY*

April 10, 1962

United States Patent Office 3,028,792
Patented Apr. 10, 1962

3,028,792
VARIABLE POWER SPOTTING TELESCOPE
Michael Krajowsky, Rochester, and Eugene L. Turner, Brighton, N.Y., assignors to Bausch & Lomb Incorporated, Rochester, N.Y., a corporation of New York
Filed July 21, 1960, Ser. No. 44,460
4 Claims. (Cl. 88—32)

The present invention relates to spotting telescopes of the type which are particularly applicable for viewing objects, such as birds, etc.

The present invention has for a particular object the provision of an improved spotting telescope of simple construction, embodying a variable magnification or zoom lens system and which enables the observer or person using the telescope to vary the degree of magnification afforded thereby.

A more particular object of the present invention is to provide a spotting telescope embodying a generally tubular elongated casing and including a housing member disposed at one side of the casing for mounting the movable lens elements of the telescope, which housing is retained within the casing by a single fastening member.

A further, more detailed object of the present invention is to provide a spotting telescope having a variable magnification erecting lens system or zoom lens system wherein the different erecting lenses are respectively longitudinally movable in order to change the magnification afforded by the telescope and wherein the erecting lenses are controlled by a pair of spiral cams cooperable with cam followers which provide substantially the same force of frictional engagement against the cams regardless of the position of the erecting lenses within their range of movement. In this connection, the cam followers each comprise a pin disposed on one side of the cam with a spring urged plunger disposed on the opposite side of the cam and with the pin and spring urged plunger being aligned substantially normal to the average direction of slope of the associated cam.

Because of the particular structural features utilized in the present invention, the spotting telescope comprising the subject matter of the present invention is greatly improved and the ease with which the erecting lenses can be adjusted is considerably facilitated.

The foregoing objects and advantages as well as numerous others will become more apparent from the following detailed description when read in conjunction with the accompanying drawing, wherein.

Figure 1:
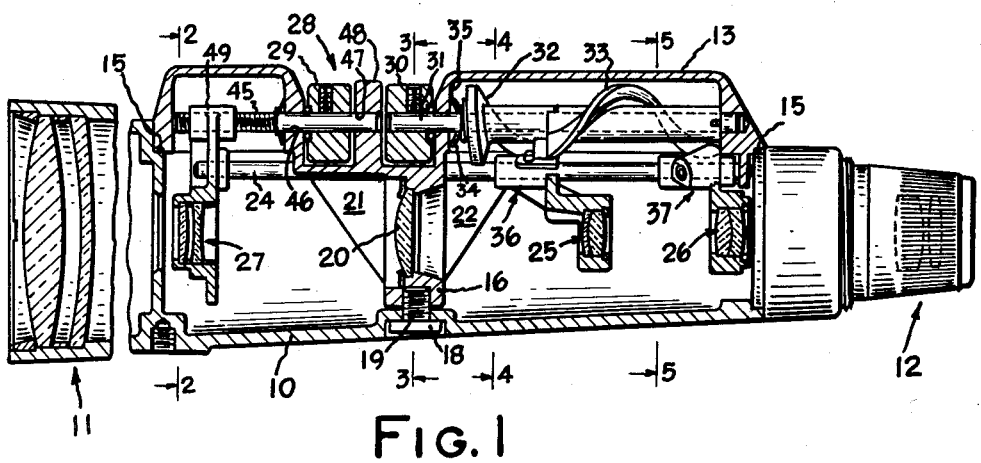
FIG. 1 is a side elevational view, shown partly in section, illustrating the principal features of the spotting telescope comprising the subject matter of the present invention.
Figure 2:
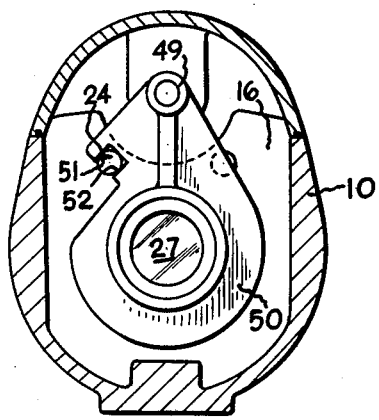
FIG. 2 is a sectional view taken substantially along the line 2—2 in FIG. 1 and looking in the direction of the arrows.
Figure 3:
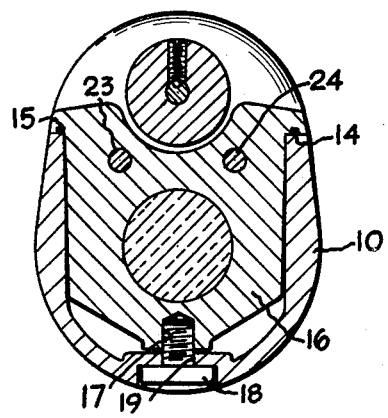
FIG. 3 is a sectional view taken substantially along the line 3—3 in FIG. 1 and looking in the direction of the arrows.
Figure 4:
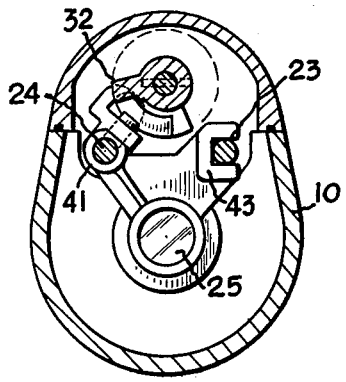
FIG. 4 is a sectional view taken substantially along the line 4—4 in FIG. 1 and looking in the direction of the arrows.
Figure 5:
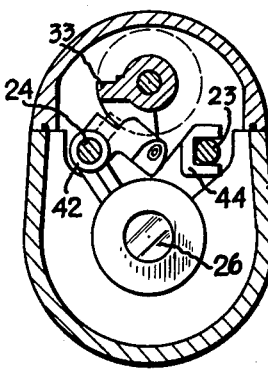
FIG. 5 is a sectional view taken substantially along the line 5—5 in FIG. 1 and looking in the direction of the arrows.

With reference now to the drawing, wherein like reference numerals in the different views identify identical parts, the spotting telescope disclosed herein comprises a generally elongated tubular casing 10 having an objective 11 comprising a plurality of lenses disposed at one end of the casing 10 and an ocular or eyepiece 12 comprising a plurality of lens elements threaded into the other end of the casing 10. The casing 10 is open along one side for the purpose of receiving a housing member 13, which is formed with a peripheral groove 14 within which a rubber-like sealing ring 15 is received in order to seal the housing member 13 with respect to the tubular casing 10.

The removable housing member 13 is formed with a central projecting portion or bracket 16 which is adapted to be received within the casing 10 and which is formed with a threaded opening 17 for receiving a connecting screw 18 which extends through a suitable opening 19 in the casing 10 in order to retain the housing 13 in assembly with the casing 10. The projecting portion 16 of housing 13 also serves as a mounting for a stationary ray converging lens element 20 and, if it is desired, a pair of strengthening ribs 21 and 22 may be provided for rigidifying the member 16 with respect to the remainder of the housing 13. The stationary ray converging lens element 20 may be retained within the projecting portion 16 in any convenient manner.

A pair of mounting rods 23 and 24 are provided for slidably mounting a pair of erecting lens elements 25 and 26 and the rod 24 extends through the projecting portion 16 and serves also partially to mount a focusing lens element 27. The focusing lens element 27 and the lens elements 20, 25 and 26 are all disposed in optical alignment with objective 11 and ocular 12.

The housing 13 is recessed in the generally central region thereof, as indicated by reference numeral 23, for the purpose of providing space for mounting a pair of adjusting knobs 29 and 30. A shaft 31 is rotatably mounted within the housing 13 and projects into the space 28 where adjusting knob 30 is mounted thereon. The shaft 31 also carries a pair of spiral cams 32 and 33 respectively provided for facilitating longitudinal adjustment of the erecting lenses 25 and 26. A spring washer 34 acts between surface 35 and the left-hand end of cam 32 in order to retain the cams 32 and 33 in a relatively fixed axial position within the housing 13.

Figure 6:
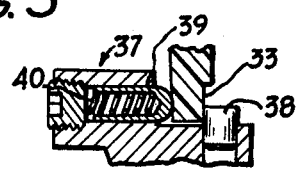
FIG. 6 is a detailed, fragmentary, sectional view illustrating the cam follower mechanism for each of the erecting lenses.

A pair of cam follower mechanisms are respectively designated by reference numerals 36 and 37, FIG. 6 showing the details of cam follower mechanism 37 only, and it being understood that this cam follower mechanism is substantially identical in all respects to the cam follower mechanism 36 for the erecting lens 25. The cam follower mechanism 37 comprises a pin 38 which cooperates with one side of cam 33 and a spring urged plunger 39 disposed on the opposite side of cam 33 which is continuously urged thereagainst by means of spring 40. The plunger 39 and pin 38 are aligned substantially normal to the average slope of cam 33, that is, they are disposed in a line forming a substantial right angle to the average slope of the cam 33 so that there is, as nearly as possible, a substantially constant frictional force against the cam 33 regardless of the position of the follower 37 along the cam 33.

The erecting lens elements 25 and 26 are each carried by the rods 23 and 24, as stated heretofore, each of the mounts for the lens elements 25 and 26 being a bearing portion 41 and 42 respectively for riding along rod 24 and bearing portions 43 and 44 for respectively riding along rod 23.

An adjusting shaft 45 is provided for focusing lens element 27, extends through a suitable opening 46 formed in housing 13 and projects through a similar opening 47 formed in the divider 48 in the substantial middle of depression 28. The shaft 45 is threaded, as indicated, and a threaded portion 49 of mounting member 50 for focusing lens 27 receives the threaded shaft 45. A pair of locating bearing surfaces 51 and 52 are provided for cooperation with shaft 24 in order to align the focusing lens element 27.

Upon rotation of knob 29, the focusing lens element 27 may be axially or longitudinally adjusted. Upon rotation of knob 30, the cams 32 and 33 are each rotated and this effects longitudinal adjustment of the erecting lenses in order to vary the magnification provided by the telescope as desired.

By providing the single mounting or retaining bolt 18, assembly and disassembly of the housing 13 relative to the casing 10 in order to clean or adjust the telescope is considerably facilitated and by providing the cooperable spring urged plunger 39 and pin 38, substantially the same force of frictional engagement is provided for the followers 36 and 37 regardless of the position thereof along the cams 32 and 33 so that there is no change in the feel of the knob 30 regardless of the position thereof.

It is contemplated that numerous changes and modifications may be made in the present invention without departing from the spirit or scope thereof.

What is claimed is:

1. A variable power telescope comprising an elongate tubular casing having ocular and objective lens means respectively mounted at the opposite ends thereof, an elongate removable housing disposed along one side of said casing and including a generally centrally disposed bracket formed as an integral part of the housing and projecting into said casing, said bracket mounting a relatively fixed ray converging lens element and said housing including means mounting a focusing lens element at one end of the housing and a pair of erecting lens elements at the other end of the housing, all of said lens elements being disposed in optical alignment with said ocular and objective lens means, means forming a threaded opening in said bracket, and a single connecting screw passing through an opening in the casing and threadedly received in said bracket opening for retaining said removable housing in assembly with said casing.

2. A variable power telescope comprising an elongate tubular casing having ocular and objective lens means respectively mounted at the opposite ends thereof, an elongate housing secured to said casing and including means mounting a focusing lens element at one end of the housing and a pair of longitudinally movable erecting lens elements at the other end of said housing, said lens elements being disposed in optical alignment with said lens means, means for effecting longitudinal adjustment of said focusing and erecting lens elements and including manually rotatable spiral cam means for adjusting the erecting lens elements, and each of said erecting lens elements including cam follower mechanism comprising a pin for engaging one side of the associated cam means and a spring urged plunger for engaging the opposite side of the associated cam means, whereby the frictional force of engagement between the cam follower mechanism and the associated cam means is substantially constant throughout the range of travel of the erecting lens elements.

3. A variable power telescope comprising an elongate tubular casing having ocular and objective lens means respectively mounted at the opposite ends thereof, an elongate housing secured to said casing and including means mounting a focusing lens element at one end of the housing and a pair of longitudinally movable erecting lens elements at the other end of said housing, said lens elements being disposed in optical alignment with said lens means, means for effecting longitudinal adjustment of said focusing and erecting lens elements and including manually rotatable spiral cam means for adjusting the erecting lens elements, each of said erecting lens elements including cam follower mechanism comprising a pin for engaging one side of the associated cam means and a cooperable spring urged plunger for engaging the opposite side of the associated cam means, and each cooperable plunger and pin being aligned substantially normal to the average slope of the associated cam means for facilitating cooperation between the cam means and follower mechanism, whereby the frictional force of engagement between the cam follower mechanism and the associated cam means is substantially constant throughout the range of travel of the erecting lens elements.

4. A variable power telescope comprising an elongate tubular casing having ocular and objective lens means respectively mounted at the opposite ends thereof, an elongate removable housing disposed along one side of said casing and including means mounting focusing, erecting and ray converging lens means in optical alignment with said ocular and objective lens means, a single connecting member for retaining the removable housing in assembly with the casing, means for effecting longitudinal adjustment of the focusing and erecting lens means and including manually rotatable spiral cam means for adjusting the erecting lens means, each of said erecting lens means including cam follower mechanism comprising a pin for engaging one side of the associated cam means and a cooperable spring urged plunger for engaging the opposite side of the associated cam means, and each cooperable plunger and pin being aligned substantially normal to the average slope of the associated cam means for facilitating cooperation between the cam means and follower mechanism, whereby the frictional force of engagement between the cam follower mechanism and the associated cam means is substantially constant throughout the range of travel of the erecting lens elements.

References Cited in the file of this patent

UNITED STATES PATENTS

| 812,464 | Swasey | Feb. 13, 1906 |

FOREIGN PATENTS

| 21,621 | Great Britain | of 1913 |
| 283,865 | Italy | Mar. 25, 1931 |